R. D. WICKERSHAM.
ADJUSTABLE HANDLE FOR PERCOLATORS.
APPLICATION FILED MAY 25, 1921.
1,389,336.
Patented Aug. 30, 1921.
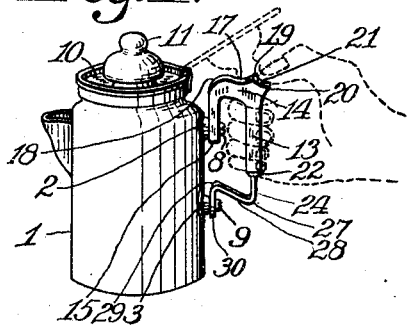
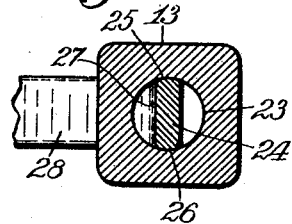
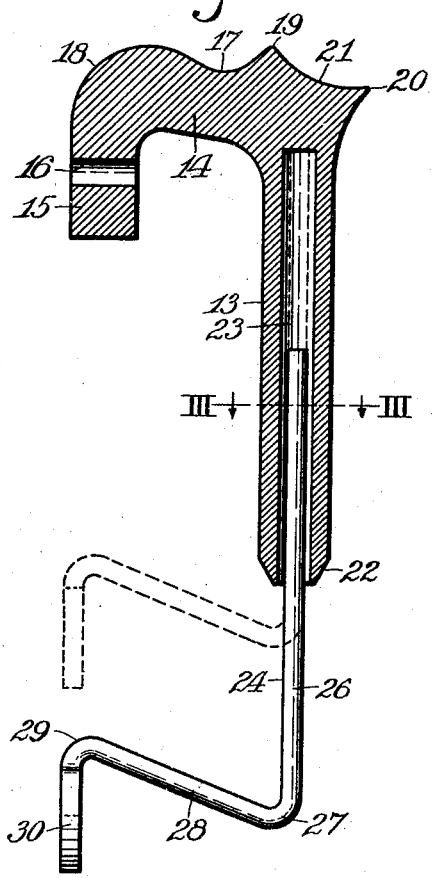
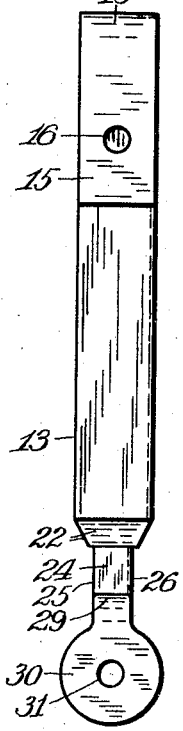
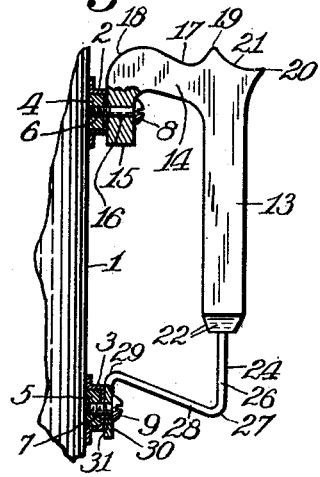
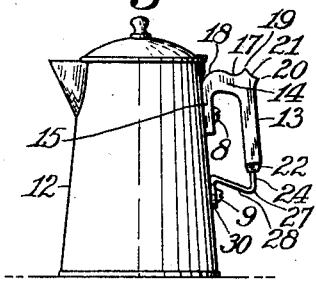
INVENTOR:
Roy D. Wickersham,
BY
E. T. Silvius,
ATTORNEY.

UNITED STATES PATENT OFFICE.

ROY D. WICKERSHAM, OF PERRY TOWNSHIP, MARION COUNTY, INDIANA.

ADJUSTABLE HANDLE FOR PERCOLATORS.

1,389,336.  Specification of Letters Patent.  Patented Aug. 30, 1921.

Application filed May 25, 1921. Serial No. 472,479.

*To all whom it may concern:*

Be it known that I, ROY D. WICKERSHAM, a citizen of the United States, residing in Perry township, in the county of Marion and State of Indiana, have invented a new and useful Adjustable Handle for Percolators, of which the following is a specification, reference being had to the accompanying drawings and to the letters and figures of reference marked thereon.

This invention relates to a handle that is designed to be applied to a percolator, a coffee pot, or to any vessel to which the handle may be suited, and more particularly to supply a new and improved handle when the handle originally applied to the vessel is broken, burned away or has otherwise become useless.

An object of the invention is to provide an adjustable handle which shall be so constructed as to be adapted to be applied to vessels of different sizes, and to those having securing devices variously located on the vessel whereby to secure the handle thereto.

Another object is to provide a handle for percolators, coffee pots and other vessels, which shall be so constructed as to not be liable to be destroyed or damaged by fire when heating the contents of the vessel, especially over a flame, as from a gas burner.

A further object is to provide a handle for vessels or articles of the above-mentioned character which, although usually exposed to a high degree of heat in use, shall not become burned and damaged and shall be so constituted as to afford a safe handle which may be clasped by the bare hand without danger of burning the hand of the user, and which shall be durable and economical in use.

With the above-mentioned and other objects in view, the invention consists in a longitudinally extensible or contractible handle of novel construction and having certain improved parts; the invention consisting also further in the parts and combinations and arrangements of parts as hereinafter particularly described and further defined in the accompanying claims.

Referring to the drawings,—Figure 1 is a perspective view of a percolator provided with the improved handle; Fig. 2 is a vertical, central, sectional elevation of the new handle; Fig. 3 is a transverse section on the line III—III in Fig. 2 on an enlarged scale; Fig. 4 is a rear elevation of the handle in contracted arrangement; Fig. 5 is a side elevation of the improved handle with portions in section showing the details whereby the handle is fastened to a percolator; and, Fig. 6 is a side elevation of a coffee pot having the improved handle applied thereto.

Similar reference characters on the different figures of the drawings indicate corresponding elements or features of construction herein referred to in detail.

In the drawings the numeral 1 indicates a percolator which is usually provided with two keepers, 2 and 3, which are spaced a certain distance apart on one size of percolator and may be various distances apart, one above the other, on different sizes of percolators, and that retain screw-threaded nuts, 4 and 5, respectively, in which securing screws 6 and 7 are arranged, respectively, the screws having heads 8 and 9 thereon respectively. The percolator usually has a lid 10 hinged to its top portion, and the lid commonly has a knob 11 on its top. Commonly the percolator has been equipped with a wooden handle of more or less ornamental design, but the lower portion of the handle as constructed has been exposed to the heat applied under the percolator and became ruined, and in some cases burned away. Likewise, the coffee pot 12 has in some cases been equipped with a wooden handle secured in place by bolts above alluded to.

A practical embodiment of the invention includes a non-metallic main part and a metallic extension part, it being designed that the main part which is required to be handled is not a conductor of heat, or not a good one. The main part is composed of a single piece of material, such as hard wood, vulcanized fiber, or other suitable material and it comprises a body 13 having a lateral arm 14 on one end thereof, which has a lug 15 on its end that extends back opposite to the body and has a bolt hole 16 therein to receive the screw, or bolt, 6 whereby to secure it rigidly to the keeper 2, the body being approximately vertical on the vessel. The upper portion of the arm 14 has a concavity 17 to receive the knob 11 when the lid of the vessel is swung back on its hinge, and the arm preferably has a round upper end portion 18 which in some cases affords clearance for a cover hinge, as on a coffee pot. In the formation of the concavity a projection 19 is formed against which the knob 11 is stopped. The body 13 has an upwardly and forwardly extending projection 20 adapted to constitute a thumb rest which is formed partially in a concavity 21 made between the projection 19 and 20 to receive the thumb of the hand when carrying the handle. The opposite or lower end of the body preferably has a beveled outer edge 22 and the body preferably is straight and has a cylindrical bore 23 extending from its lower end nearly to the upper end thereof. The metallic part of the handle comprises a plate and straight extension rod 24 which has rounded edges 25 and 26 corresponding in curvature to the curvature of the bore 23, the rod being of suitable width to permit it to be forcibly inserted into the bore 23 and to be tightly held in the bore. The outer end of the rod 26 has a crook 27 thereon from which extends an arm 28 at an acute angle relatively to the rod, and the arm has a crook 29 thereon from which extends an anchor plate 30 having a bolt hole 31 therein to receive the screw or bolt 7 whereby the plate is secured to the keeper 3.

The handles are designed to be kept in stock and retailed, besides being applied in factories to new articles. When a new handle is required the parts of the destroyed or damaged handle may be readily removed after first removing the screws or bolts 6 and 7, after which the bolts may be used to secure the new handle in place. The rod 26 may be adjusted longitudinally into the bore 23 so that the bolt holes 16 and 31 shall be the required distance apart to receive the securing screws or bolts.

In practical use the lower end of the rod 26 is of necessity held sufficiently far from the flame or direct heat of the fire to prevent it from becoming excessively hot, but although heated it need not be touched by the hand, the body 13 which is protected by its distance from the flame or heat being clasped by the hand with the thumb in the concavity 21. It will be seen that there are spaces in the bore 23 at opposite sides of the rod 26 in which air may enter and circulate so that a mild degree of heat which may be conducted to the body of the handle will be more or less dissipated and prevent the handle from becoming uncomfortably warm.

Having thus described the invention, what is claimed as new is:—

1. An adjustable handle comprising a non-metallic main part having a bore therein, the main part having a lateral arm provided on its end with a lug, and a metallic part comprising a rod longitudinally adjustable in the bore in the main part and having an arm thereon provided with an anchor plate.

2. An adjustable handle comprising a main part having a straight hollow body and a lateral carrying arm, and a rod longitudinally adjustable in the hollow body and having a relatively acute angled arm thereon, the carrying arm having a lug thereon extending toward the end of the acute angled arm, the acute angled arm having an anchor plate thereon extending in the direction away from the lug.

3. An adjustable handle comprising a main part consisting of non-metallic material and having a straight hollow body and a lateral arm on one end of the body, and a lug extending from the end of the arm and parallel to the body, the body and the arm having each a concavity in the top thereof; said lug having an aperture therein to receive a securing bolt; and a metallic part comprising a straight flat rod longitudinally adjustable in said hollow body and having transversely curved edges frictionally engaging the wall of said body, an arm extending from the outer end of said rod at an acute angle thereto, and an anchor plate extending from the acute-angled arm at an acute angle thereto and in the direction away from said lug, said plate having an aperture therein to receive a securing bolt.

In testimony whereof, I affix my signature in presence of two witnesses.

ROY D. WICKERSHAM.

Witnesses:
E. T. SILVIUS,
ROBERT LIEBRICH.